United States Patent [19]
Ponzielli

[11] Patent Number: 5,223,199
[45] Date of Patent: Jun. 29, 1993

[54] METHOD OF AND APPARATUS FOR PUMPING PARTICULATE SOLIDS

[75] Inventor: Giuseppe Ponzielli, Solaro, Italy

[73] Assignee: GPW Macchine S.a.S. di Giuseppe Ponzielli & C. of Via Vallone, Italy

[21] Appl. No.: 730,616

[22] Filed: Jul. 16, 1991

[30] Foreign Application Priority Data

Jul. 17, 1990 [IT] Italy .............................. 20955 A/90

[51] Int. Cl.$^5$ .............................................. B29C 67/00
[52] U.S. Cl. .................................. 264/114; 198/617;
264/109; 264/349; 406/99; 406/197; 415/90
[58] Field of Search ................ 264/86, 109, 114, 117, 264/118, 349; 425/84, 222, 376.1, 472; 415/90; 406/99, 197; 198/617, 723

[56] References Cited

U.S. PATENT DOCUMENTS

| | | | |
|---|---|---|---|
| 3,884,855 | 5/1975 | Baumann et al. | |
| 4,102,109 | 7/1978 | Modra et al. | |
| 4,142,805 | 3/1979 | Tadmor | |
| 4,213,709 | 7/1980 | Valsamis | 264/349 |
| 4,421,412 | 12/1983 | Hold et al. | 415/90 |
| 4,516,674 | 5/1985 | Firth | 415/90 |
| 5,051,041 | 9/1991 | Firth | 406/99 |

FOREIGN PATENT DOCUMENTS 0326036 1/1989 European Pat. Off. .

OTHER PUBLICATIONS

European Search Report dated Oct. 23, 1991.

Primary Examiner—Mary Lynn Theisen
Attorney, Agent, or Firm—Wigman & Cohen

[57] ABSTRACT

A method of pumping particulate solids that have an initial bulk density which is lower than its structural density; the method comprises providing a flow channel (12) having an inlet (120) and an outlet (129) and including (i) an annular drag flow channel segment (L1) formed between a stationary outer wall member (14) and a rotating circular inner wall member (16); and (ii) a straight channel segment (L2) formed between a first planar and stationary wall portion (148) and a second planar and stationary wall portion (182); the inlet (120) of rotary channel (12) is that of the drag flow channel segment (L1) while the outlet (129) of flow channel (12) is that of the straigth channel segment (L2); no axial cross-section of the flow channel (12) between the inlet (120) and the outlet (129) is smaller than the axial cross-section of the inlet (120); the particulate solid is passed through the flow channel (12) so as to increase the initial bulk density and avoiding significant melting and/or thermal degradation of the particulate solid while in the flow channel (12).

21 Claims, 6 Drawing Sheets

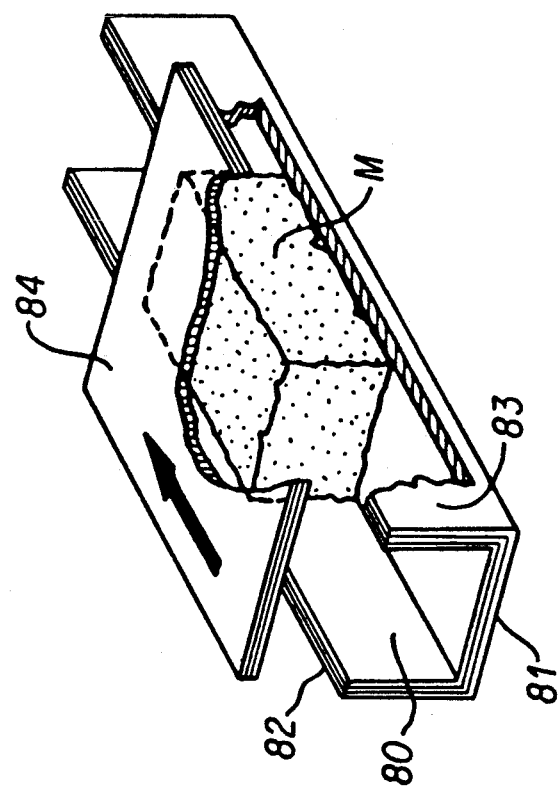

METHOD OF AND APPARATUS FOR PUMPING PARTICULATE SOLIDS

BACKGROUND OF THE INVENTION (1) Field of the Invention

This invention relates to processing of particulate solids as well as to an apparatus for use in this method. More specifically, the invention relates to a method for pumping or continuously compressing a particulate solid material and to a novel pump for particulate solids.

(2) Description of the Prior Art

Processing of particulate (i.e. existing in the form of particles, e.g. flakes, granules, powder etc.) solids having an apparent or "bulk" density which is lower than the structural density of the material per se, such as "plastics" scrap, frequently presents substantial processing problems when conveying and/or feeding the material into a processor, e.g. when recycling thermoplastic scrap, waste, or refuse having a low or very low bulk density, such as flakes or foamed particles, into an extruder via a chute or hopper. In fact, future economics of using and notably of recycling plastics of various kinds may be influenced significantly by the way in which low bulk density solids can be processed economically.

While various devices are known for compressing particulate solids in the form of product stream, those operating continuously tend to be complicated and costly, such as extruders, or are not suitable for general application, such as vane-type pumps.

EP-A-326,036 discloses a compacting device for feeding an extruder by means of a hollow piston that reciprocates within an elongated tubular space coaxially arranged within the extruder barrel. Optionally, a precompactor having a pair of reciprocating rams may be added but in either case compaction is effected by displacement flow, i.e. a pumping effect based upon moving element pistons or "rams" having a contact face that presses or rather compresses the particulate solid.

U.S. Pat. No. 4,102,109 discloses a wool press wherein compression of a bulky fibre mass is effected either by displacement flow caused by the vanes of a rotor or by pressure flow such as generated at the nip of a roller pair.

Finally U.S. Pat. No. 4,142,805 (Tadmor patent herein) discloses a plastics processing method using a rotary channel of the drag flow type, i.e. where a particulate material, such as a pelletized thermoplastic polymer, is compressed within an annular space or channel formed between an essentially circular inner rotor and an essentially cylindrical outer housing. The expressed aim of the approach taught in Tadmor patent is to generate frictional heat within the processed material to the extent that the latter will melt and exit from the apparatus as a liquid product.

Because the concepts underlying flow phenomena in general and drag flow in specific are explained in detail in the Tadmor patent and other publications by this author ( Z. Tadmor and I. Klein, "Engineering Principles of Plasticating Extrusion"; New York 1979; and Z. Tadmor et al, "Principles of Polymer Processing", Wiley Intersc. Publ. 1979) these publications are incorporated herein by way of reference for brevity of the specification, and the three basic types of flow that are of interest herein, i.e. drag flow, pressure flow, and displacement flow will not be discussed in detail.

Since the device disclosed in the Tadmor patent is intended mainly for processing of thermoplastic polymers, and because a molten product is to be obtained at the exit of the device, temperatures of typically in the range of 120° to 250° C. must be generated essentially by friction. Now, it is apparent that in order to achieve such temperatures, a maximum of friction and/or turbulence is required and this is obtained by a tortuous and locally restricted path to be followed by the material within the apparatus; local overheating may occur, notably if the properties of the processed material stream are not reasonably uniform, and this is a requirement that severely limits use of such devices in recycling of thermoplastic polymers. Further, the device disclosed in the Tadmor patent is of little use for processing materials that are thermosensitive, i.e. have a low stability against thermal degradation, such as organic substances which contain hydroxy groups and tend to split off water upon heating.

As a result, drag flow devices of the type disclosed in the Tadmor patent have been limited to processing streams of particulate thermoplastics having a reasonably high degree of uniformity, a relatively high bulk density, and a relatively low sensitivity to overheating.

Typical scrap materials, however, that could or should be processed for recovery or recycling of the polymer that constitutes the particulate material, do not normally satisfy these requirements and cannot be processed economically by prior art devices, notably if the particulate solid material has a low or very low bulk densities and/or when requiring a processing step that is to involve compression or compaction with relatively low cost machinery at reasonably low temperatures of typically below melting temperatures of thermoplastic polymer, i.e. well below 120° C., preferably even below 100° C.

OBJECTS AND BRIEF SUMMARY OF THE INVENTION

The term "particulate" in connection with "solids" as used herein to define the material of interest for the invention is intended to refer to any normally solid material, i.e. solid at normal ambient conditions, in the form of particles of such sizes that the material can be processed as a virtually continuous "stream" of material, e.g. by conventional pneumatic or mechanical conveying means, typically having average particle sizes in the range of from 0.1 mm to 100 mm, neither limit being considered overly critical.

Now, it is a main object of the present invention to provide for a novel method of pumping particulate solids, which may but need not be thermoplastic and may be heat-sensitive, by a method based essentially upon a drag flow mechanism but without the disadvantages of prior art methods and notably without significant heating of the material.

Another object of the invention is a novel method of compressing a particulate solid for the purpose of compacting, extruding, or agglomerating the particulate solid, or for removing normally liquid components therefrom.

While processing of low bulk density materials (e.g. 5 to 200 grams per liter) that may but need not be thermoplastic is an important object of the invention, processing of particulate materials of most any kind and having a bulk density of up to about 70% of the structural density by compression with improved effectiveness as well as increased efficiency is an important general object of the invention.

Yet a further object of the invention is a novel pump for solids that can be used universally for any purpose that requires compression of a particulate material.

Still another object is a novel apparatus for extruding or agglomerating a particulate solid or for removing a normally liquid component therefrom.

Further objects will become apparent as this specification proceeds

Now, according to a first method embodiment of the invention, these objects are achieved by a novel method of pumping a particulate solid material having an initial bulk density and a structural density which exceeds the initial bulk density by (I) providing a rotary flow channel having an inlet end and an outlet end; the inlet end has an axial cross-section, i.e. when viewed in a plane aligned with the axis of ration and defined, for example, between a relatively short portion of the inner wall of an external stator and a relatively long portion of the outer wall of an internal rotor; the rotary flow channel includes (i) a substantially annular drag flow channel segment formed between a stationary outer wall member and a rotating circular inner wall member; and (ii) a substantially straight channel segment formed between a first essentially planar stationary wall portion and a second essentially planar stationary wall portion; generally, the straight channel segment should provide a smooth low-friction passage of the material from the drag flow segment to the outlet, generally by aligning the central axis of the straight channel segment with a tangent to the central circular axis of the drag flow segment; the inlet end of the flow channel is located in the annular drag flow segment, preferably at the upstream end thereof, while the outlet end is provided in the substantially straight channel segment, preferably at the downstream end thereof; further, no axial cross-section of the entire rotary flow channel between its inlet end an its outlet end must be smaller then the axial cross-section of the inlet end so that no constriction and no significant impediment to smooth flow is formed between inlet and outlet of the flow channel; the particulate solid is passed through the rotary flow channel so as to increase the initial bulk density and avoiding significant melting and/or thermal degradation of the particulate solid while in the flow channel.

The terms "upstream" and "downstream" as used herein refer to the direction of flow of particulate solids through the rotary channel so that "upstream" is closer to the inlet end and "downstream" is closer to the outlet end of the rotary channel.

According to its most general apparatus embodiment, the invention provides a pump for compressing a particulate solid material as defined above and comprises a rotary flow channel of the type just described having an inlet end and an outlet end; the rotary flow channel includes a substantially annular drag flow segment formed between a stationary outer wall member, also called "stator", and a rotating circular inner wall member, also called "rotor", and (ii) a substantially straight channel segment formed between a first essentially planar stationary wall portion and a second essentially planar stationary wall portion; the inlet end of the rotary channel is located in the drag flow segment, preferably at it's upstream end, while the channel's outlet end is provided in the substantially straight channel segment, preferably at it's downstream end; all dimensions of the rotary flow channel, when viewed in axial cross section, between the inlet end and the outlet end are selected to provide for smooth flow and avoidance of steep deflections so as to prevent flow impediments and constrictions that would cause frictional heating to the point where the solid melts or decomposes. This, of course, is the exact opposite of what is taught by the art where steep deflections of the flow path as well as restrictions within the channel or near its end are a critical requirement.

BRIEF DISCUSSION OF PREFERRED EMBODIMENTS

In an embodiment preferred for many purposes of processing particulate materials of low or very low bulk density the inventive method comprises an additional precompaction step for increasing the initial bulk density of the particulate solid material prior to passing same through the rotary flow channel. Gravity feeding or other suitable methods including drag flow means are not excluded, however and two or more pumps according to the invention might be connected in series.

In an analogous manner, throughput may be increased by arranging two or more inventive pumps in parallel.

While mere compaction by the pump may be a practical application, e.g. by providing a controlled flow impediment downstream of the channel's outlet so as to produce a continuous mass of compacted solid, it is preferred for many purposes of the invention to provide for an additional processing step, e.g. extrusion, agglomeration including granulation, or removal of liquid constituents from the particulate solid.

Generally and in contrast with the generally vertical alignment of the annular channel or channels disclosed in the Tadmor patent, it is preferred according to the invention to position the flow channel such that a radial plane, i.e. one intersecting perpendicularly with the axis of rotation of the rotor, is substantially aligned with a horizontal plane.

In line with the above mentioned processing aims of the invention, a preferred pump comprises an additional means for precompacting the particulate solid prior to feeding it into the flow channel. In a particularly preferred embodiment of the pump, the precompacting means comprises a chute or hopper and a reciprocatingly actuated ram for to-and-fro motion within a space or chamber at the lower end of the chute or hopper; an exit opening is provided for pressing material at the lower end of the hopper into the flow channel near the inlet thereof. The front face of the ram may be shaped to form, or not to form, a continuation of the circular portion of the stator wall and/or or may move foreward to complete the annular channel or to form a more narrow portion with parallel circularity or converging in counter-rotational direction for additional momentum.

Generally, the drag flow segment of the channel is substantially defined by the annular space between the stator and the rotor but the "peripheral length" (as appearing when viewed in an axial plane) of the stator wall portion must be smaller then the corresponding peripheral length of the rotor wall portion so that the strength of frictional contact between the solids and the rotor wall exceeds the strength of frictional contact between the stator wall portion.

For many purposes of the invention the rotor has an annular cavity, e.g. in the form of a "U" resting on one of its sides while the stator wall portion of the drag flow segment is formed by an essentially cylindrical inner wall. However, many other geometric shapes including polygonal or round shapes may be matched to form the channel walls while satisfying the requirement of different frictional strength and are encompassed by the invention. Again in contrast with prior art teaching that friction must be increased within the chamber, the wall portion of the stator in the drag flow segment according to the invention preferably is made as smooth as possible without protruding elements and even by providing specific friction-reducing means, e.g. by lining the stator wall portion that forms one limitation of the channel with a self-lubricating material, such as a teflon.

Generally it is preferred in a pump according to the invention that the second or "inner" stationary wall portion of the straight channel segment is aligned as a tangential plane of the innermost or base surface of the rotor wall forming a part of the drag flow segment.

Accordingly, a deflector body of a pump according to the invention will have its operating face preferably arranged at "zero" angle relative to the point of closest approach to the rotor. Again, this is contrast with the art teaching "steep" deflection angles relative to the rotor surface of 90° or more. The other or first wall forming the opposite lateral limitation of the straight segment should be arranged so as to form a path laterally limited by walls that are parallel or, preferably, diverge in downstream direction.

Finally, it is preferred for many purposes to combine the inventive pump with a means for further processing of the solid, e.g. by extrusion, agglomeration, granulation or liquid removal.

With the preferred embodiment of the pump for processing low bulk density materials, such as typically expanded polystyrene, a pass through precompactor and rotary channel may provide for compaction by a factor in the range of from about 5 to about 50 times the initial bulk density.

When applying the invention for agglomeration or granulation a perforated element having openings in accordance with the cross-section of the agglomerates can be arranged downstream of the pump's outlet and a scraper means at the backside of the perforations serves to control the length of the agglomerates.

When processing for liquid removal from a particulate solid, e.g. for removal of water, extraction fluid, or solvent, contained in the particulate solid material, suitable outlets can be arranged in the wall of the flow channel, e.g. in the stator wall or in the walls of the straight channel segment, or by forcing the compressed material that emanates from the pump against a separator member with a plurality of small openings, such as a sieve plate or the like filtering device.

DESCRIPTION OF THE DRAWINGS

The invention will be further exemplified but not limited by means of the enclosed drawings illustrating certain preferred embodiments of the invention and in which:

FIG. 1A is a schematic illustration of a solids pump 1 comprising a mechanical compactor device 13 for passing a low bulk density material (not shown) along the path indicated by a dash-pointed line starting at the upper end of hopper 139 having, at its lower end, a chamber 130 in which the feed material is pressed by ram 131 through opening 137 which can be regarded as an entry 103 into flow channel 12. The actuation drive of ram 131 for reciprocating movement within a casing 132 is not shown. Preferably, a pneumatic drive will be used to cause reciprocating movement of ram face 133 towards flow channel 12 and a away from it. At the end of each forward motion of ram 131, ram face 133 may either be in alignment with opening 103 or proceed towards the innermost wall of rotor 16.

Figure 1A:
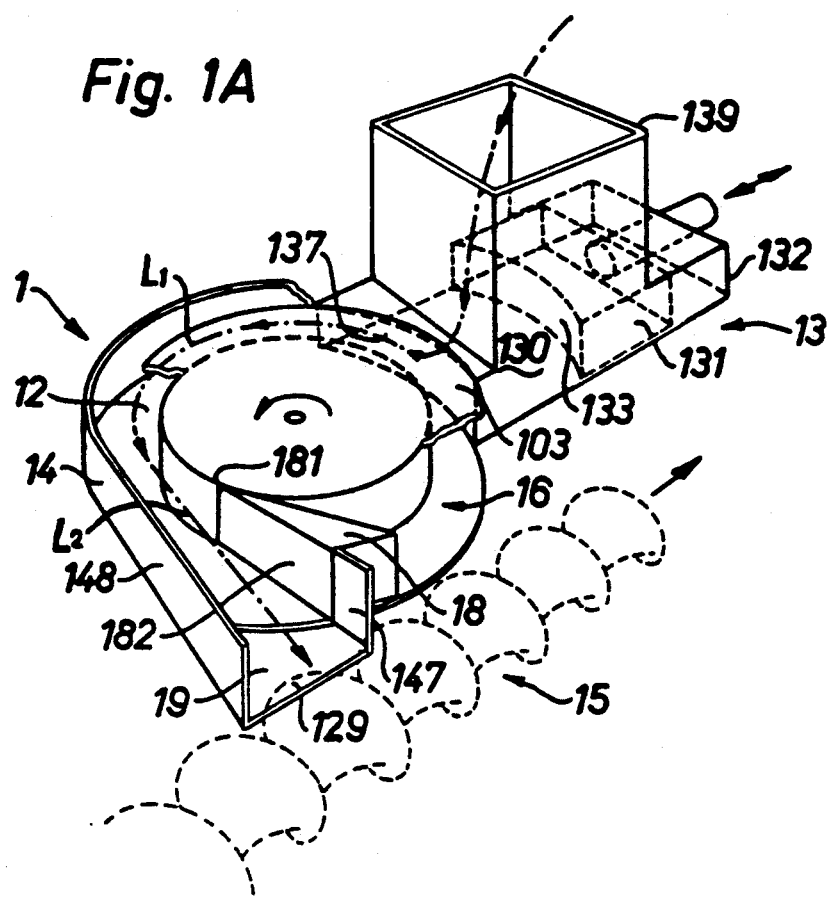
FIG. 1A is a diagrammatic an partially broken away perspective view of a pump according to the invention.

Flow channel 12 is defined essentially by a first and substantially annular drag flow section L1 formed between stator 14 and rotor 16. A wedge-shaped deflector 18 is arranged so that its acute end or apex 181 is in sliding contact with those walls of rotor 16 that define the rotating portion of the drag flow segment L1 of channel 12. An essentially straight channel segment L2 is formed between a first and essentially planar wall portion 148 of stator 14 and a second and essentially planar warm 182 provided by deflector 1S. Obviously, the upper and lower walls of the drag flow segment L1 are formed by the horizontal end flanges of rotor 16. A portion of the lower and upper (broken away) wall of segment L2 will also be formed by the flanges of rotor 16 but the end portion may be complemented by a continuation 147 of stator wall 148, a bottom member 19, a continuation 147 of wall 182 and a top wall (not shown) so as to form an outlet end 129 of flow channel 12 preferably matching the cross-sectional geometry of the circular segment but with an outwardly increasing cross-sectional area.

As will become apparent from this diagrammatic presentation, forward motion of the particulate material in annular channel segment L1 will be effected essentially by drag flow while continued motion of the particulate material in segment L2 of channel 12 will be caused increasingly (as downstream movement continues) by displacement flow caused by particulate solids in further up-stream portions of channel 12.

The compacted material that emanates from outlet 19 passes into the barrel (not shown) of a conventional extruder 15 shown in broken lines to emphasize the optional nature of this additional processing device.

Figure 1B:
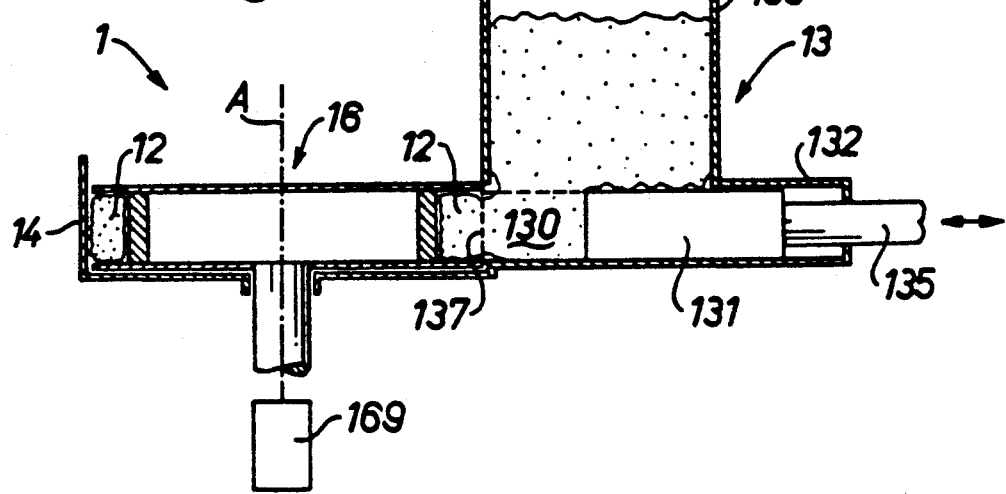
FIG. 1B is a sectional and partially broken away side view of the apparatus of FIG. 1A.

As shown in the sectional view of FIG. 1B, rotor 16 is driven by a motor 169 to rotate around axis A in the direction of the curved arrow depicted in FIG. 1A. In FIG. 1B the solid particulate material is shown diagrammatically to fill hopper 139 as well as precompaction chamber 130 in which it is compressed and pressed into channel 12 whenever ram 131 is moved by its drive 135 in the direction toward pump 1. When ram 131 is in its most forward at the left end of its back-and-forth motion it may become, for a short time, a part of the of the wall of channel 12, or it may proceed into a position closer to rotor 16. In any case it is assumed that any drag flow effect in the channel space between ram face 133 and rotor 16 is minor if compared to the displacement flow caused by ram 131 in radial direction. Accordingly, any possible contribution of this temporary channel portion will normally be disregarded when calculating the length of segment L1 in the examples below.

Figure 1C:
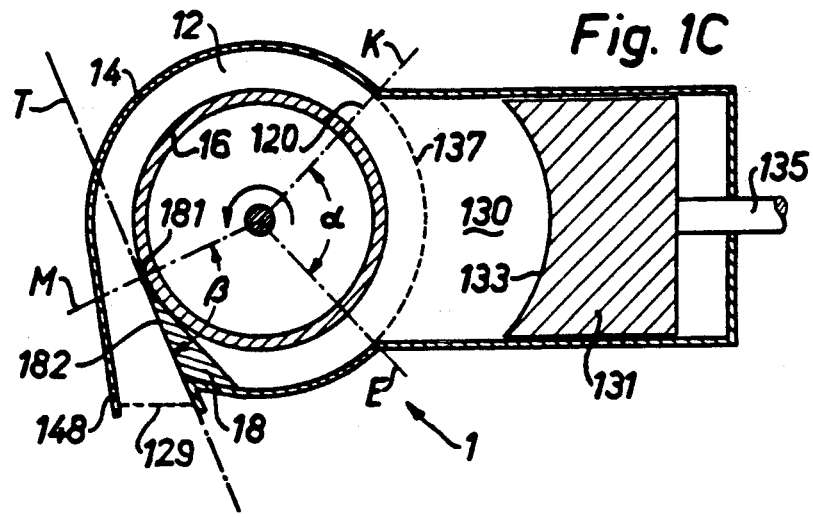
FIG. 1C is a sectional and partially broken away top view of the apparatus shown in FIG. 1A.

The temporary channel portion formed between ram face 133 when moving into the position of exit opening 137 of chamber 130 is again apparent from the top view shown in FIG. 1C. Here, the extent of opening 137, e.g. between lines K and E and defined by angle $\alpha$ is shown and it becomes apparent why the inlet end of channel 12 is assumed to be defined by the axial cross-section of channel 12 in the radial plane defined by line K. FIG. 1C further shows the preferred alignment of wall 182 of deflector 18 such that it coincides with a tangential plane T defined by an angle $\beta$ of 90° at the intersection of axial plane M defined by edge 181, i.e. the line where deflector 18 is in sliding contact with rotor 16. As is also apparent from FIG. 1C, wall portion 148 of stator 14 is arranged such as to provide a diverging end portion or segment L2 explained above.

Figure 2:
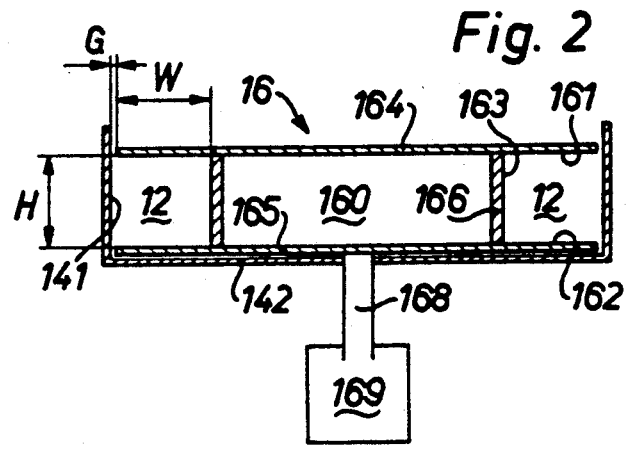
FIG. 2 is a diagrammatic sectional side view, somewhat enlarged and simplified, of rotor and stator of a pump similar to that shown in FIG. 1A.

FIG. 2 is shown to explain exemplary configuration parameters of stator 16. Essentially, rotor 16 can be formed by two parallel circular plates or walls 164, 165 that are interconnected by a cylindrical body or wall 166. Then, the inner faces 161, 162, 163 formed around channel 12 will constitute the moving portion of the drag flow section of channel while the cylindrical stator wall portion 141 forms the stationary portion of the drag flow section of channel 12. A lower wall or bottom 142 of the stator is shown but the upper wall or lid has been omitted for simplicity of presentation. The parameter "H" in FIG. 2 defines the "height" of flow channel 12 and its drag flow segment, i.e. the perimeter of stator surface 141 as well as that of the cylindrical base surface 163 of rotor 16. "W" in FIG. 2, on the other hand defines the "width" of the channel 12 and a simple operational parameter can be given by defining the ratio of the stator parameter H to the rotor parameter W+H+W. This, however, is given but as an illustrative example because the rotor part of the channel could as well be formed of only one, e.g curved wall, or two or more than three walls. For reasons explained in more detail in connection with the mathematical model, the rotor wall parameter exemplified by W+H+W should always exceed the stator wall parameter exemplified by H, e.g. by a factor of 3 or more. With regard to gap "G" between rotor 16 and stator wall 141, such gap is not believed to be overly critical as long as it is smaller than the particle size of the solid. When processing very fine particulate solids or when the actual material processed contains or tends to form fines, a suction device may be arranged within the pump housing to remove fines as they pass through any gaps.

Figure 3A:
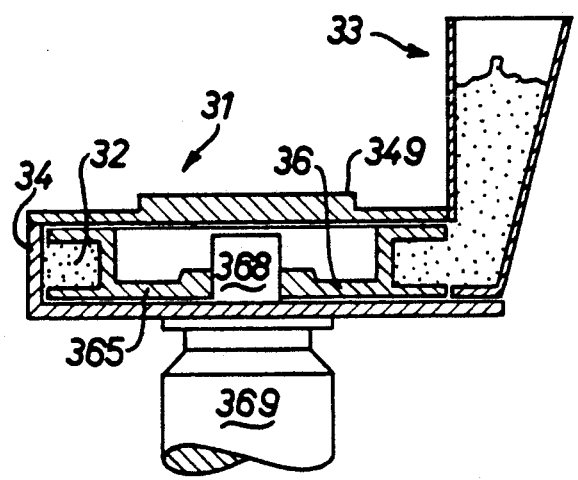
FIGS. 3A and 3B are semi-diagrammatic sectional views of an inventive pump with a hopper instead of the precompactor shown in the preceding Figures.
Figure 3B:
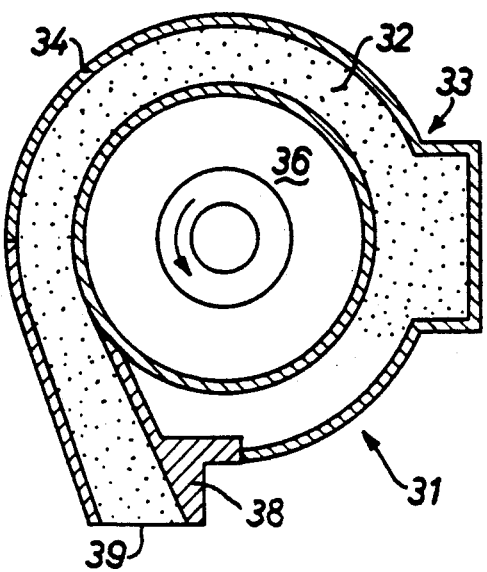

FIGS. 3A and 3B are semi-diagrammatic sectional views in vertical or axial (FIG. 3A) and horizontal or radial planes. Pump 31 is fed without significant precompaction from a hopper 33. Flow channel 32 is formed by stator 34, a monolithic rotor 36 formed by a circular bottom plate 365 plus attached flanges and a deflector 38 to define one side wall of the straight channel segment forming part of outlet end 39. Rotor 36 moves in the direction of the circular arrow under the impact of drive motor 369 and its connector or shaft 368. The stator housing is closed on its top side by a lid or cover 349 that can be removed for maintenance purposes.

Figure 4A:
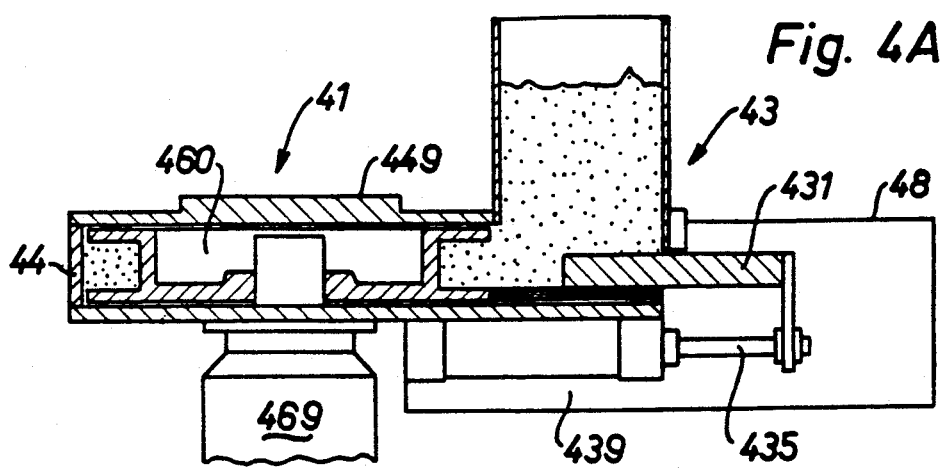
FIGS. 4A and 4B show a similar pump as in FIGS. 3A and 3B except that a ram-operated pre-compactor has been added.
Figure 4B:
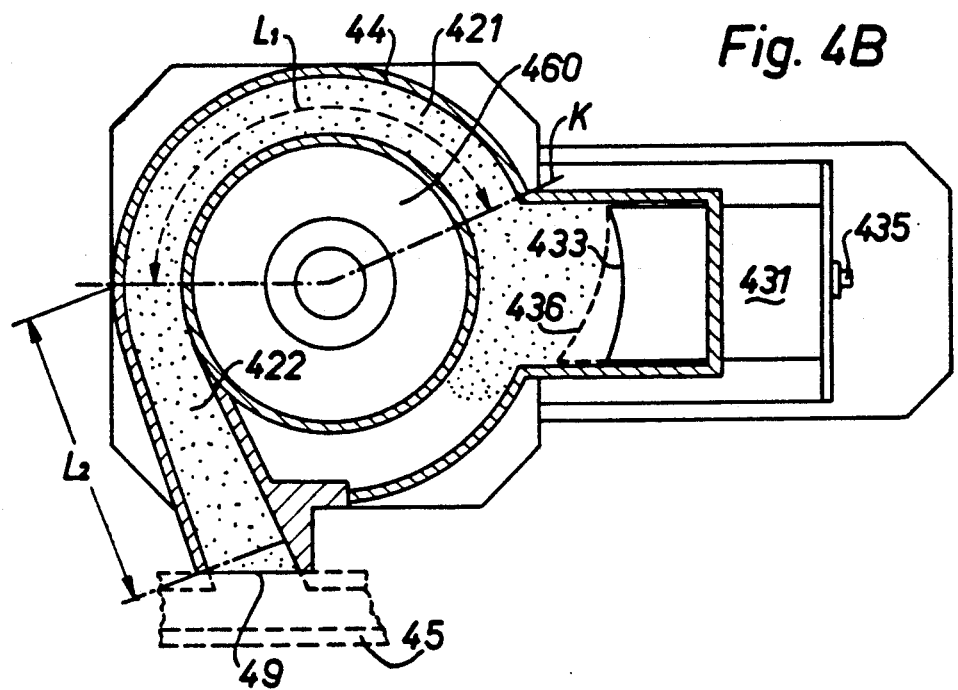

FIGS. 4A and 4B are semi-diagrammatic sectional views showing a pump 41 similar to that of FIGS. 3A and 3B except that a precompactor 43 is added as explained above. Ram 431 is moved by a pneumatically operated actuator 435. A pump of this type was used in examples illustrating test runs with several types of materials and the significant parameters of the length of the drag flow segment L1 and that of the straight segment L2 are indicated. The inlet of flow channel 421 is assumed to be in the axial plane K; the end of drag flow segment L1 is assumed to be defined by the axial plane that intersects with stator wall 44. Outlet end 49 can be connected with the inlet of a coordinated processor device 45 or provided with a pressure sensor for testing the effectiveness of the operation of the pump when used for compressing different materials. Ram 431 may have its front face 433 shaped to complete a circular enclosure of channel 421, and forward movement of ram 431 could be limited to do so or be controlled so as to proceed beyond circular completion for increased precompaction of the material before it enters into channel 421 at the corss-section thereof defined by the vertical plane through line K. Alternatively, as shown in broken line, front face 436 of ram 431 may be shaped in a manner that provides for progressed precompaction within the material that is more distanced from line K if the front edge ("upper" edge in FIG. 4B) of front face 436 that is closer to line K moves into a position that essentially coincides with the outer radius of channel 421 at line K. with the non-coaxial curvature of front face 436, or a functional equivalent, the edge of ram face 436 that is more removed from K ("lower" edge in FIG. 4b) may move foreward towards the rotor 460 until it substantially contacts the vertical annular surface thereof so as to generate an additional "pumping" momentum in the material upon precompaction thereof by ram 431.

Figure 5:
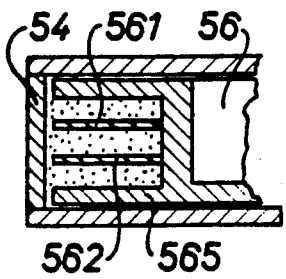
FIG. 5 is a sectional partial view of a modified rotor.

FIG. 5 is a diagrammatic sectional and broken-away view of a modification of rotor 56 having two additional wall-forming rings 561, 562 so as to enlarge the ratio of the rotor surface relative to the channel-forming portion of stator wall 54.

Figure 6:
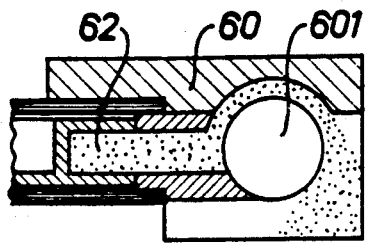
FIGS. 6 and 7 are diagrammatic sectional views, broken away, of additional processing devices connected to the pump outlet.

FIG. 6 illustrates an example of the connection between pump channel 62 and an associated device 60 which in FIG. 6 is a simple flow control rod 601 to permit generation of a substantially increased resistance of the particulate solids that form a bed of compressed material within channel 62 so as to press out liquid initially contained in the particulate solid. Opening for the pressed-out liquid can be provided within the pump or in the associated device 60 but are not shown in the drawing.

Figure 7:
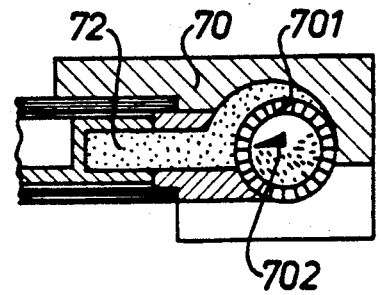
Figure 8B:
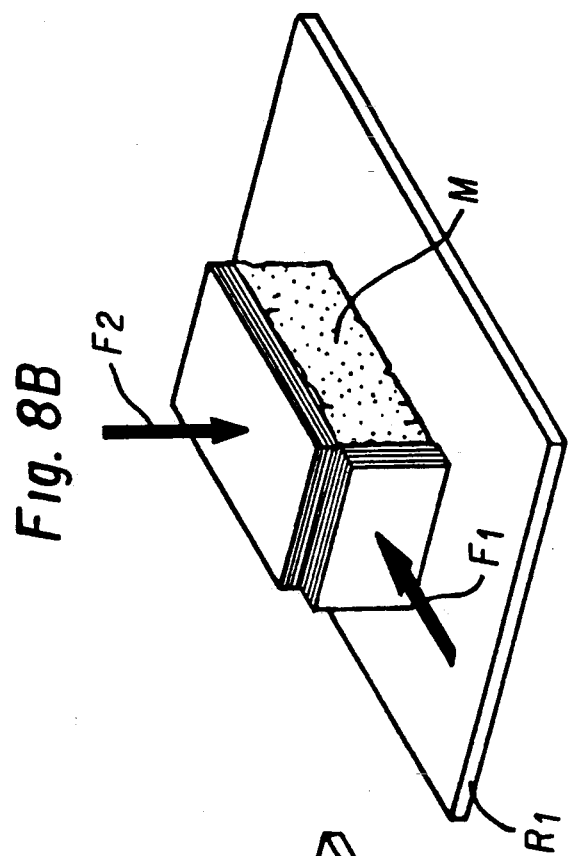
FIGS. 8A, 8B, 8C. 8D and 8E are diagrammatic perspective views of a mass of particulate solid that is to be moved along a plane to illustrate aspects of a mathematical model of some basic concepts of the invention.
Figure 8A:
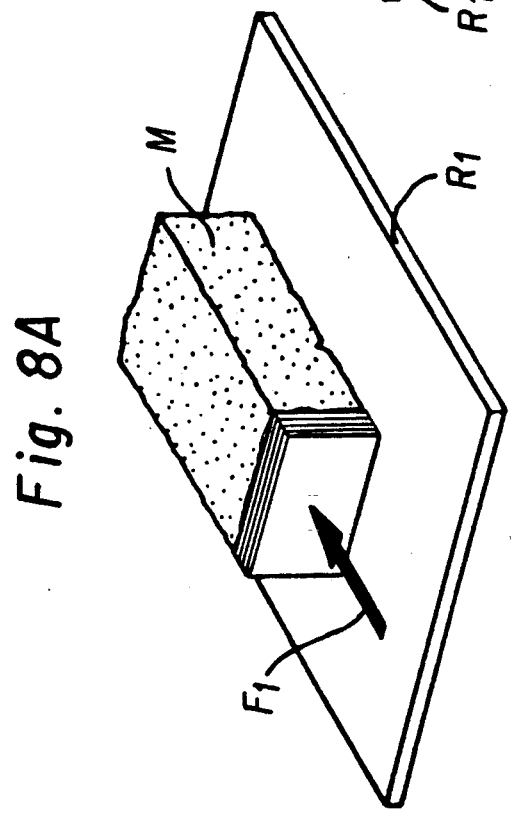
Figure 8D:
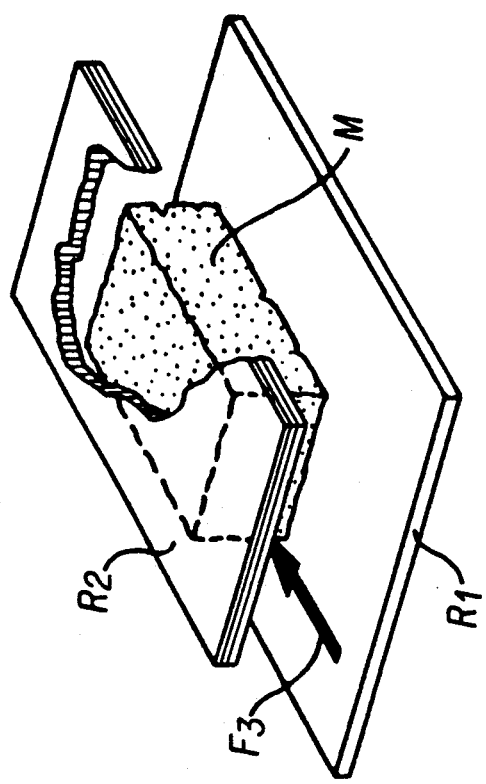
Figure 8C:
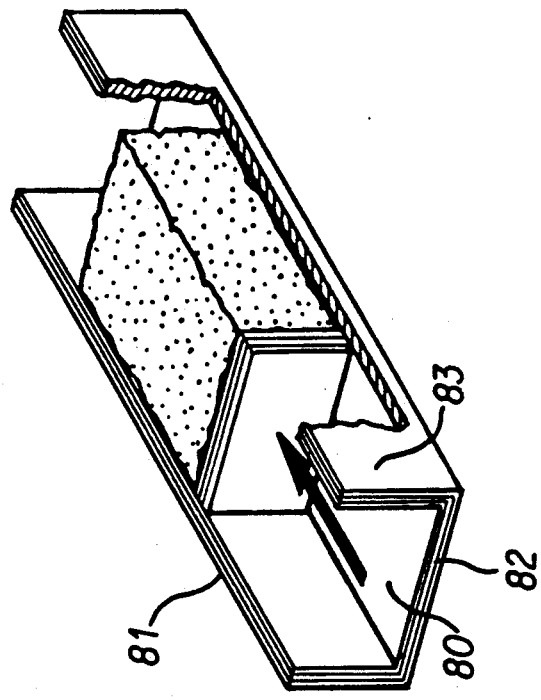

FIG. 7 shows a view similar to that of FIG. 6 except that device 70 is a granulator that receives compressed particulate material from channel 62 and includes a perforated tubular element 701 provided with a scraper 702 for removal of the granulate formed. Element 701 and/or scraper 702 could be actuated for relative rotational motion. The diameters of the granules formed will be determined essentially by the openings of element 701 while the length of the granules will depend upon the speed of the relative motion between scraper 702 and element 701.

FIGS. 8A, 8B, 8C, 8D and 8E are perspective diagrammatic representations of a mass M composed of particulate solid that is moved under the impact of different types of forces plates along a surface R1 or along a channel 80. Details will be given in Example 7.

Generally, the novel pump tends to exhibit a maximum drag flow effect and a minimum of mechanical displacement flow when flow resistance within the channel is low. With an increase of flow resistance, accumulation of solid at the downstream portion of the channel will increase and so will compaction therein, normally until an equilibrium is reached as indicated by a constant rate of discharge of compacted material. Optimum parameters can be established by means of a few simple tests for any given material and processing object. Preferably, the rotor drive is a constant-power drive motor, i.e. a hydraulic, electric, or pneumatic drive which can be operated such that the product of torque of the drive and drive velocity remains substantially constant when in operation under varying external loads.

The invention will now be further explained in the following examples given for illustration and not limitation.

EXAMPLES 1-6

A pump essentially as shown was used with the following parameters (cf. FIGS. 1, 2 and 4):

| | |
|---|---|
| Perimeter $P_1$ of stator wall in an axial plane (H, FIG. 2) | 0.048 m |
| Perimeter $P_2$ of rotor wall in an axial plane (W + H + W, FIG. 2) | 0.198 m |
| Length $L_1$ of channel portion 421 (FIG. 4B) | 0.792 m |
| Length $L_2$ of channel portion 422 (FIG. 4B) | 0.342 m |
| Channel height (H, FIG. 2) | 0.048 m |
| Channel width (W, FIG. 2) | 0.075 m |
| Outer diameter of rotary channel | 0.6 m |
| Inner diameter of rotary channel | 0.45 m |
| Average diameter of rotary channel | 0.525 m |
| Cross-sectional area of channel in portion 421 (FIG. 4B) | 0.0036 m$^2$ |
| Cross-sectional area of channel in exit portion 422 (FIG. 4B) | 0.00576 m$^2$ |
| Stator wall coating | Polytetrafluoroethylene |
| Wall material | C40 steel |

In Example 1 "Maralene" (registered trademark) low density polyethylene recovered from recycled "Tetrapak" (registered trademark) packaging of about 90% purity containing about 10% of Al plus inks and other residues in the form of granules of about 3×3 mm having a bulk density (measured on solids at inlet) of 497.5 g/l and a structural density of 920 g/l with a humidity content was used to test pump effectiveness by measuring the exit force (in kg) using a commercial pressure sensor (loading cell) at exit 49 of FIG. 4B. A constant power drive was used as drive "469" and the speed of rotation was monitored as well as the temperature of the rotor. Solid bed length was measured by means of a length probe. "RC speed" is the speed of the rotary channel in terms of rotations per minute. The change of these operational parameters was determined in dependence upon the mass (expressed in kg) of particulate solds accumulated in the channel and the results are given in Table I.

TABLE I

| RC speed (rpm) | test temp. (°C.) | mass in channel (kg) | exit force (kg) | length of solid bed (m) |
|---|---|---|---|---|
| 32.2 | 32 | 0.2 | 0 | 0.304 |
| 32.2 | 32.5 | 0.4 | 0 | 0.399 |
| 32.2 | 32.9 | 0.6 | 0 | 0.429 |
| 32.2 | 33.5 | 0.8 | 1.24 | 0.504 |
| 32.2 | 34.3 | 1 | 3.7 | 0.564 |
| 32 | 33.6 | 1.2 | 18.60 | 0.624 |
| 31.6 | 37.5 | 1.4 | 71.42 | 0.704 |
| 23 | 40.7 | 1.6 | 186 | 0.774 |
| 14 | 42.1 | 1.8 | 347.18 | 0.854 |
| 9 | 48 | 2 | 496 | 0.934 |
| 5 | 48.6 | 2.2 | 607.56 | 1.014 |

Example 2 was repeated essentially as is described for Example 1 except that the "Marlene" material was in the form of flakes of about 30×30 mm with a thickness of 10-20 micrometers and a bulk density of 16 g/l.

The results are as reported in Table II.

TABLE II

| RC speed (rpm) | test temp. (°C.) | mass in channel (kg) | exit force (kg) | length of solid bed (m) |
|---|---|---|---|---|
| 32.2 | 38.7 | 0.2 | 1.85 | 0.384 |
| 32 | 38.2 | 0.4 | 8.68 | 0.614 |
| 31.1 | 40.3 | 0.6 | 46.50 | 0.534 |
| 31.3 | 42.7 | 0.8 | 55.80 | 0.664 |
| 31 | 46 | 1 | 89.90 | 0.694 |
| 30.9 | 49.3 | 1.2 | 99.2 | 0.924 |
| 24 | 53.7 | 1.4 | 229.4 | 0.950 |
| 20 | 65.5 | 1.6 | 303.58 | 0.984 |
| 19.9 | 68.7 | 1.8 | 464.97 | 1.004 |
| 8 | 83 | 2 | 483.57 | 1.024 |

Example 3 was operated essentially in the same manner as example 1 except that the material used was expanded polystyrene in the form of globules of about 2 mm diameter. Bulk density at inlet end of rotary channel was 7.51 g/l while the structural density was 1030 g/l.

The results are reported in Table III.

TABLE III

| RC speed (rpm) | test temp. (°C.) | mass in channel (kg) | exit force (kg) | length of solid bed (m) |
|---|---|---|---|---|
| 32 | 19.7 | 0.04 | 14.26 | 0.684 |
| 31.3 | 22.2 | 0.08 | 43.40 | 0.564 |
| 29.7 | 25 | 0.12 | 71.30 | 0.654 |
| 29.3 | 30 | 0.16 | 96.09 | 0.724 |
| 28.8 | 34.8 | 0.20 | 114.70 | 0.724 |
| 28.3 | 37.5 | 0.24 | 124 | 0.734 |
| 24.6 | 40 | 0.28 | 142.60 | 0.914 |
| 25 | 42.3 | 0.32 | 148.80 | 0.984 |
| 23 | 45.1 | 0.36 | 164.29 | 1.064 |
| 27 | 46.9 | 0.38 | 134.53 | 1.024 |
| 27 | 50.1 | 0.42 | 148.79 | 1.034 |
| 26.5 | 51 | 0.46 | 144.45 | 1.064 |
| 29.5 | 52 | 0.50 | 120.89 | 1.134 |

Example 4 was carried out in the same manner as example 3 except that the material used to test the pump was "Rigidex" (registered trademark), a high-density polyethylene, in the form of granules of about 3×3 mm with a bulk density of 616.9 g/l and a structural density of 948 g/l.

The results are as reported in Table IV.

TABLE IV

| RC speed (rpm) | test temp. (°C.) | mass in channel (kg) | exit force (kg) | length of solid bed (m) |
| --- | --- | --- | --- | --- |
| 32.2 | 36.2 | 0.2 | 0.00 | 0.284 |
| 32.2 | 38.7 | 0.4 | 0.00 | 0.344 |
| 32.2 | 38.7 | 0.6 | 0.00 | 0.364 |
| 32.2 | 37.5 | 0.8 | 0.00 | 0.464 |
| 32.3 | 37.3 | 1 | 0.62 | 0.504 |
| 32.2 | 36.5 | 1.2 | 1.24 | 0.594 |
| 32.2 | 35.8 | 1.4 | 4.96 | 0.634 |
| 31.5 | 36.8 | 1.6 | 16.12 | 0.694 |
| 31.8 | 36.3 | 1.8 | 27.90 | 0.784 |
| 31.5 | 37.2 | 2 | 43.40 | 0.884 |
| 31.5 | 39.1 | 2.2 | 86.80 | 0.974 |
| 27 | 42 | 2.4 | 155.00 | 1.034 |
| 20 | 45.8 | 2.6 | 216.99 | 1.134 |

Example 5 was carried out as the preceding examples except that the material used to test the pump was "Valtec" (registered trademark), a commercial polypropylene in the form of beads having a bulk density of 458.4 g/l, a structural density of 900 g/l and a diameter of about 2 mm.

The results are as reported in Table V.

TABLE V

| RC speed (rpm) | test temp. (°C.) | mass in channel (kg) | exit force (kg) | length of solid bed (m) |
| --- | --- | --- | --- | --- |
| 7 | 45 | 2.250 | 471.17 | 1.134 |
| 7.5 | 51.9 | 2.250 | 465 | 1.134 |

Example 6 was carried out in the same manner as example 5 except that the "Moplen" (registered trademark) polypropylene in the form of 3×3 mm granules having a bulk density of 586.6 g/l and a structural density of 900 g/l was used to test the pump.

The results are as reported in Table VI.

TABLE VI

| RC speed (rpm) | test temp. (°C.) | mass in channel (kg) | exit force (kg) | length of solid bed (m) |
| --- | --- | --- | --- | --- |
| 16 | 45 | 2.250 | 235.58 | 1.014 |
| 13.9 | 55.4 | 2.550 | 247.98 | 1.134 |

EXAMPLE 7

A mathmatical model was developed to show important parameters when operating the invention (cf. FIGS. 8A to 8E).

Considering the behaviour of a body or mass consisting of a particulate solid of mass M resting on a plane $R_1$ and moved by displacement, e.g. a ram, along the plane by a force $F_1$, the condition of steady motion is $$F_1 = \mu_1 \cdot F_M \qquad \text{(equ. 7.1)}$$

wherein $F_M$ is the force-equivalent of the weight of the solid and $\mu_1$ is the coefficient of friction between the mass of particulate solid and plane $R_1$. When an additional second force $F_2$ is added and acts upon the solid mass in a direction perpendicular to plane $R_1$, then $$F_1 = \mu_1 \cdot (F_M + F_2) \qquad \text{(equ. 7.2)}$$

When the same mass M of particulate solid is pushed by mechanical displacement, as by a ram, through a chamber of constant longitudinal cross-section and length L, the (so-called Janssen) formula will apply:

$$F_L = F_o \cdot exp(-\mu K P L / A) \qquad \text{(equ. 7.3)}$$

in which
- $F_o$ = initial applied force (e.g. expressed in kg)
- $F_L$ = axially transmitted force at distance L (e.g. expressed in kg)
- K = ratio of radial to axial compressive forces
- P = effective perimeter of cross-section (e.g. expressed in meters)
- A = cross-sectional area (e.g. expressed in m²)
- $\mu$ = coefficient of friction between solids and the channel walls.

In the closed chamber model investigated by Janssen, any pressure effected or created within the chamber must have a direction preventing out-flow and the main prior art interest in equ. 7.4 (below) concerned improvements of the out-flow conditions of granular substances, such as cereals, from cylindrical or conical silos (cf. Z. Vereinig. Dtsch. Ing., 39 (1985), pages 1045-1049; "Tests on grain pressure silos". In contrast, the invention is based upon the use of drag-flow to effect pumping of particulate solids, and a simple model can be set up assuming a chamber having a square cross-section. There is no other mechanical displacement as that effected by a ram, and motion is assumed in a horizontal plane. Mass M of a particulate solid is dragged on plane $R_1$ by motion of wall $R_2$ relative to plane $R_1$ by force $F_3$. This results in drag-flow of the solid in the direction of force $F_3$. Then, the above prior art equation 7.3 can be transformed, according to the invention, as follows:

$$F_L = F_M \cdot exp[(P_2 \cdot \mu_2 - P_1 \cdot \mu_1) K L / A)] \qquad \text{(equ. 7.4)}$$

wherein
- $F_M$ = initial applied force (e.g. in kg)
- $P_2$ = perimeter (e.g. length in axial plane) of the moving wall portion of the channel
- $\mu_2$ = coefficient of friction between the particulate solids and wall $R_2$ (adimensional entity)
- $P_1$ = perimeter (e.g. length in axial plane) of the stationary wall portion of the channel
- $\mu_1$ = coefficient of friction between particulate solids and the stationary wall portion of the channel
- K = ratio of radial stress to axial stress (an adimensional entity)
- L = length of the solid bed formed within the channel (e.g. in m)
- A = cross-sectional area of channel in axial planes (e.g. in m²).

The practical result of this novel approach as taught by the invention is that the forces against the moving wall transforms a frictional force (which is negative with respect to the motion) into a positive one. Dragging due to a single moving wall is poor, however, and the condition $\mu_1 = \mu_2$ describes a physical situation in which no flow will occur. Flow starts to occur when $\mu_1 > \mu_2$ and improves when $P_2$ approaches $P_1$ as a consequence of the reduction of the two walls perpendicular to $R_2$. A problem arises here because the sectional area approaches zero thus making impossible any transport of the solids.

Now, the pump according to the invention is a device which permits to optimize the principle indicated e.g. in equ. 7.4 by transforming into a conveying condition a type of force which normally presents a severe obstacle to flow of solids.

As exemplified by the diagrammatic view of FIG. 8E this is caused because the majority of the walls 81, 82, 83, 84 that form the channel 80 of the novel pump (preferably three moving walls, one stationary) generates a "friction drive" in the direction of the flow, and this mechanism becomes more and more efficient when the pressure inside the channel increases because of an increasing flow resistance. In practice, two opposed but synergic phenomena are to be observed when operating according to the invention:

(A) On one side the channel tends to clog because of an exponential increase of pressure according to equ. 7.3;

(B) on the other side, phenomenon (A) creates the optimum conditions for positive friction which drives the solids in the direction of the flow.

On the basis of the novel principle expressed by equ. 7.4, the design of a pump according to the invention with a circular channel 80 can be optimized for any given purpose by minimizing resistance within the channel to increase efficiency of the pump. This is quite unexpected because one would assume on the basis of the teaching of U.S. Pat. No. 4,142,805 that higher friction would improve operation of a rotary channel device for processing particulate solids.

From the considerations of Example 7 it appears that a preferred embodiment of the invention operates with a rotary channel formed between at least one rotating circular channel wall portion and at least one stationary wall portion, wherein the rotating wall portion has a periphery, viewed in an axial plane (planes extending along the axis of rotation) that is greater than the periphery, again viewed in an axial plane, of the stationary wall portion, e.g. because the channel 80 is formed between three rotating walls 81, 82, 83 and only one stationary wall 84 that has essentially the same perimeter length as wall 81 of the rotary part of channel 80.

It should be emphasized, however, that the radial plane (i.e. that intersecting perpendicularly with the axis of rotation) of the rotary channel will preferably be aligned horizontally in many embodiments of the invention in order that gravitational forces will not cause force gradients.

Also, it is apparent from Example 7 that the cross-section of the channel of a rotary pump according to the invention must be substantially free of constrictions and/or deviations that would increase friction, and that melting of the particulate solids must be safely prevented. For example, cooling means may be used to maintain the temperature of the channel within limits that guarantee that melting by frictional effects within a rotary channel according to the invention is prevented under all conditions of operation and automatic control means can be used to start cooling and/or to increase cooling efficiency in a manner known per se.

It should be specifically understood that the novel solids pump illustrated in the figures only portrays preferred embodiments of the invention and that, in particular, the illustrated combinations of a solids pump according to the invention with specific feeding means and/or specific devices for utilising the compressing effect of the novel pump for improved operation of various means for processing of particulate solids are by no means limiting. The inventive method as well as the inventive pump will find many advantageous applications wherever particulate solids are processed, including production or processing of chemicals, foods, pharmaceuticals, cosmetics, plastics, agricultural chemicals, fertilizers, structural materials, moulding, petroleum industry including petrochemistry etc.

Also, the most diverse particulate solids including typical solids as well as moist products can be processed advantageously by means of the invention and the materials specifically mentioned in the Tadmor patent are candidate materials, notwithstanding the fact that the Tadmor apparatus would not be able to perform satisfactorily with many solid materials mentioned therein. This is of particular significance where the material to be processed should not or cannot be heated to melting temperatures but should be pumped or compressed safely at temperatures that have no detrimental effect upon the material.

It is to be understood that the foregoing detailed description is given merely by way of illustration and that variations can be made therein without departing from the spirit of the invention. ACCORDINGLY,

What I claim is:

1. A method of pumping a particulate solid material having an initial bulk density and a structural density which exceeds said initial bulk density; said method comprising:

(I) providing a rotary flow channel having an inlet end and an outlet end; said inlet end having an axial cross-section; said rotary flow channel including;
(i) a substantially annular drag flow channel segment formed between a stationary outer wall member and a rotating circular inner wall member; and
(ii) a substantially straight channel segment formed between a first essentially planar stationary wall portion and a second essentially planar stationary wall portion; said inlet end being provided in said substantially annular drag flow channel segment while said outlet end is provided in said substantially straight channel segment; and wherein no axial cross-section of said rotary flow channel between said inlet end and said outlet end is smaller than said axial cross-section of said inlet end; and (II) passing said particulate solid through said rotary flow channels so as to increase said initial bulk density and avoiding significant melting and thermal degradation of said particulate solid while in said flow channel.

2. The method of claim 1 wherein said step (II) of passing of said particulate material is performed while maintaining said flow channel and said material therein at a temperature of below about 100° C.

3. The method of claim 1 comprising an additional precompaction step for increasing said initial bulk density of said particulate solid material prior to passing said material through said rotary flow channel.

4. The method of claim 1 wherein said rotary flow channel is aligned substantially in a horizontal plane.

5. The method of claim 1 wherein said drag flow segment defines an essentially circular path of said solid material when being passed therethrough and wherein said substantially straight segment defines an essentially linear path substantially in the direction of a tangent of said circular path.

6. A method of pumping a particulate solid material having an initial bulk density and a structural density which exceeds said initial bulk density; said method comprising: (I) providing a rotary flow channel having an inlet end and an outlet end; said inlet end having an axial cross-section; said rotary flow channel including;

(i) a substantially annular drag flow channel segment formed between a stationary outer wall member and a rotating circular inner wall member; and (ii) a substantially straight channel segment formed between a first essentially planar stationary wall portion and a second essentially planar stationary wall portion; said inlet end being provided in said substantially annular drag flow channel segment while said outlet end is provided in said substantially straight channel segment; and wherein no axial cross-section of said rotary flow channel between said inlet end and said outlet end is smaller than said axial cross-section of said inlet end; and (II) passing said particulate solid through said rotary flow channels so as to increase said initial bulk density and avoiding significant melting and thermal degradation of said particulate solid while in said flow channel; and at least one additional further step for processing said particulate solid material by a process selected from the group consisting of agglomeration, removal of liquids, and extrusion.

7. A method of pumping a particulate solid material having an initial bulk density and a structural density which exceeds said initial bulk density; said method comprising: (I) providing a rotary flow channel having an inlet end and an outlet end; said inlet end having an axial cross-section; said rotary flow channel including; (i) a substantially annular drag flow channel segment formed between a stationary outer wall member and a rotating circular inner wall member; and (ii) a substantially straight channel segment formed between a first essentially planar stationary wall portion and a second essentially planar stationary wall portion; said inlet end being provided in said substantially annular drag flow channel segment while said outlet end is provided in said substantially straight channel segment; and wherein no axial cross-section of said rotary flow channel between said inlet end and said outlet end is smaller than said axial cross-section of said inlet end; and (II) passing said particulate solid through said rotary flow channels so as to increase said initial bulk density and avoiding significant melting and thermal degradation of said particulate solid while in said flow channel; and an additional precompaction step for increasing said initial bulk density of said particulate solid material prior to passing same through said rotary flow channel and at least one additional further step for processing said particulate solid material by a process selected from the group consisting of agglomeration, removal of liquids, and extrusion.

8. A pump for compressing a particulate solid material having an initial bulk density and a structural density which exceeds said initial bulk density; said pump comprising: (I) a rotary flow channel having an inlet end and an outlet end; said inlet end having an axial cross-section; said rotary flow channel including; (i) a substantially annular drag flow channel segment formed between a stationary outer wall member and a rotating circular inner wall member; and (ii) a substantially straight channel segment formed between a first essentially planar stationary wall portion and a second essentially planar stationary wall portion; said inlet end being provided in said substantially annular drag flow channel segment while said outlet end is provided in said substantially straight channel segment; and wherein no axial cross-section of said rotary flow channel between said inlet end and said outlet end is smaller than said axial cross-section of said inlet end so as to provide for smooth passage of said particulate solid material through said rotary flow channel and preventing melting and thermal degradation of said particulate solid material within said rotary flow channel of said pump.

9. The pump of claim 8 comprising an additional means for precompacting said particulate solid prior to passing it through said rotary flow channel.

10. The pump of claim 8 wherein any axial cross-section of said annular drag flow channel segment is substantially defined by a wall portion of said stationary wall member and a coordinated wall portion of said rotating wall member such that frictional contact strength between said particulate solid material and said wall portion of said rotating wall member substantially exceeds frictional contact strength between said particulate solid and said wall portion of said stationary wall member.

11. The pump of claim 9 wherein any axial cross-section of said annular drag flow channel segment is substantially defined by a wall portion of said stationary wall member and a coordinated wall portion of said rotating wall member such that frictional contact strength between said particulate solid material and said wall portion of said rotating wall member substantially exceeds frictional contact strength between said particulate solid and said wall portion of said stationary wall member.

12. A pump for compressing a particulate solid material having an initial bulk density and a structural density which exceeds said initial bulk density; said pump comprising: (I) a rotary flow channel having an inlet end and an outlet end; said inlet end having an axial cross-section; said rotary flow channel including; (i) a substantially annular drag flow channel segment formed between a stationary outer wall member and a rotating circular inner wall member; and (ii) a substantially straight channel segment formed between a first essentially planar stationary wall portion and a second essentially planar stationary wall portion; said inlet end being provided in said substantially annular drag flow channel segment while said outlet end is provided in said substantially straight channel segment; and wherein no axial cross-section of said rotary flow channel between said inlet end and said outlet end is smaller than said axial cross-section of said inlet end so as to provide for smooth passage of said particulate solid material through said rotary flow channel and preventing melting and thermal degradation of said particulate solid material within said rotary flow channel of said pump; and wherein said additional precompaction means comprises a hopper and a ram for reciprocating rotation within a chamber having an exit formed to cooperate with a ram face so as to push said particulate solid material towards said rotating circular inner wall member and into said rotary flow channel when said reciprocating motion of said ram moves the latter towards said exit.

13. The pump of claim 12 wherein any axial cross-section of said annular drag flow channel segment is substantially defined by a wall portion of said stationary wall member and a coordinated wall portion of said rotating wall member such that frictional contact strength between said particulate solid material and said wall portion of said rotating wall member substantially exceeds frictional contact strength between said particulate solid and said wall portion of said stationary wall member.

14. A pump for compressing a particulate solid material having an initial bulk density and a structural density which exceeds said initial bulk density; said pump comprising: (I) a rotary flow channel having an inlet end and an outlet end; said inlet end having an axial cross-section; said rotary flow channel including; (i) a substantially annular drag flow channel segment formed between a stationary outer wall member and a rotating circular inner wall member; and (ii) a substantially straight channel segment formed between a first essentially planar stationary wall portion and a second essentially planar stationary wall portion; said inlet end being provided in said substantially annular drag flow channel segment while said outlet end is provided in said substantially straight channel segment; and wherein no axial cross-section of said rotary flow channel between said inlet end and said outlet end is smaller than said axial cross-section of said inlet end so as to provide for smooth passage of said particulate solid material through said rotary flow channel and preventing melting and thermal degradation of said particulate solid material within said rotary flow channel of said pump; and at least one additional means selected from the group consisting of extruder devices, agglomerator devices and liquid-solid separator devices.

15. A method of compressing a particulate solid material having an initial bulk density and a structural density which exceeds said initial bulk density; said method comprising: (I) providing a rotary flow channel having an inlet and an outlet; said inlet having an axial cross-section; said flow channel including; (i) a drag flow segment formed between a stationary outer wall member and a moving inner wall member; and (ii) a channel segment formed between a first lateral stationary wall portion and a second lateral stationary wall portion; said inlet being provided near an upstream end of said drag flow segment while said outlet is provided near a downstream end of said flow channel; and wherein no downstream cross-section of said flow channel is smaller than any upstream cross-section thereof; and (II) passing said particulate solid through said flow channel so as to increase said initial bulk density while avoiding significant melting and thermal degradation of said particulate solid within said flow channel.

16. The method of claim 15 for compacting a continuous stream of a solid particulate material having a bulk density below about 100 grams per liter and a temperature below about 110° C. and maintaining said temperature below about 100° C. while said material is compacted.

17. A method of extruding a particulate solid material having an initial bulk density and a structural density which exceeds said initial bulk density; said method comprising: (I) providing a flow channel having an inlet and an outlet; said inlet having an axial cross-section; said flow channel including; (i) a drag flow segment formed between a stationary outer wall member and a moving inner wall member; and (ii) a channel segment formed between a first lateral stationary wall portion and a second lateral stationary wall portion; said inlet being provided near an upstream end of said drag flow segment while said outlet is provided near a downstream end of said flow channel; and wherein no downstream cross-section of said flow channel is smaller than any upstream cross-section thereof; and (II) passing said particulate solid through said flow channel so as to compress said particulate solid while avoiding significant melting and thermal degradation thereof while passing said flow channel; and (III) feeding said compressed particulate solid from said flow channel into an extruder.

18. A method of agglomerating a particulate solid material having an initial bulk density and a structural density which exceeds said initial bulk density; said method comprising: (I) providing a flow channel having an inlet and an outlet; said inlet having and axial cross-section; said flow channel including; (i) a drag flow segment formed between a stationary outer wall member and a moving inner wall member; and (ii) a channel segment formed between a first lateral stationary wall portion and a second lateral stationary wall portion; said inlet being provided near an upstream end of said drag flow segment while said outlet is provided near a downstream end of said flow channel; and wherein no downstream cross-section of said flow channel is smaller than any upstream cross-section thereof; (II) passing said particulate solid through said flow channel so as to compress said particulate solid while avoiding significant melting and thermal degradation thereof while within said flow channel; and (III) feeding said particulate solid from said flow channel into an agglomerating means.

19. A method of removing a liquid from a particulate solid material having an initial bulk density and a structural density which exceeds said initial bulk density; said method comprising: (I) providing a slow channel having an inlet and an outlet; said inlet having an axial cross-section; said flow channel including: (i) a drag flow segment formed between a stationary outer wall member and a moving inner wall member; and (ii) a channel segment formed between a first lateral stationary wall portion and a second lateral stationary wall portion; said inlet being provided near an upstream end of said drag flow segment while said outlet is provided near a downstream end of said flow channel; and wherein no downstream cross-section of said flow channel is smaller than any upstream cross-section thereof; and (II) passing said particulate solid through said flow channel so as to compress said particulate solid while avoiding significant melting and thermal degradation of said particulate solid within said flow channel; and (III) providing liquid separator means for removing said liquid from said particulate solid while the latter is compressed.

20. A method of pumping a particulate solid material having an initial bulk density and a structural density which exceeds said initial bulk density; said method comprising: (I) providing a rotary flow channel having an inlet end and an outlet end; said inlet end having an axial cross-section; said rotary flow channel including: (i) a substantially annular drag flow channel segment formed between an uninterrupted stationary outer wall member and a rotating circular inner wall member; and (ii) a substantially straight channel segment formed between a first essentially planar stationary wall portion and a second essentially planar stationary wall portion; said inlet end being provided in said substantially annular drag flow channel segment while said outlet end is provided in said substantially straight channel segment; and wherein no axial cross-section of said rotary flow channel between said inlet end and said outlet end is smaller than said axial cross-section of said inlet end; and (II) passing said particulate solid through said rotary flow channel so as to increase said initial bulk density and avoiding significant melting and thermal degradation of said particulate solid while in said flow channel.

21. A pump for compressing a particulate solid material having an initial bulk density and a structural density which exceeds said initial bulk density; said pump comprising: (I) a rotary flow channel having an inlet end and an outlet end; said inlet end having an axial cross-section; said rotary flow channel including: (i) a substantially annular drag flow channel segment formed between an uninterrupted stationary outer wall member and a rotating circular inner wall member; and (ii) a substantially straight channel segment formed between a first essentially planar stationary wall portion and a second essentially planar stationary wall portion; said inlet end being provided in said substantially annular drag flow channel segment while said outlet end is provided in said substantially straight channel segment; and wherein no axial cross-section of said rotary flow channel between said inlet end and said outlet end is smaller than said axial cross-section of said inlet end so as to provide for smooth passage of said particulate solid material through said rotary flow channel and preventing melting and thermal degradation of said particulate solid material within said rotary flow channel of said pump.

* * * * *

UNITED STATES PATENT AND TRADEMARK OFFICE
CERTIFICATE OF CORRECTION

PATENT NO. : 5,223,199
DATED : June 29, 1993
INVENTOR(S) : Giuseppe PONZIELLI It is certified that error appears in the above-identified patent and that said Letters Patent is hereby corrected as shown below:

Column 6, line 39, "deflector 1S" should be --deflector 18--.

Column 11, line 49, "mathmatical" should be --mathematical--.

Column 15, line 13, "flow channels" should be --flow channel--;

line 39, "flow channels" should be --flow channel--.

Claim 15, column 17, line 27, delete "rotary".
Claim 16, column 17, line 46, "110°C" should be --100°C--.
Claim 17, column 17, line 63, delete "and".

Signed and Sealed this

Twenty-ninth Day of March, 1994

*Attest:*

BRUCE LEHMAN

*Attesting Officer*     *Commissioner of Patents and Trademarks*